June 28, 1960    J. J. NAPOLI    2,942,401
GRAPPLING HAND-RAKE
Filed Feb. 3, 1958

INVENTOR.
John J. Napoli
BY Paul Bliven

United States Patent Office 2,942,401
Patented June 28, 1960

2,942,401

GRAPPLING HAND-RAKE

John J. Napoli, 380 Belden St., Monterey, Calif.

Filed Feb. 3, 1958, Ser. No. 712,818

6 Claims. (Cl. 56—400.12)

The present invention relates to a garden hand rake and in more particular to such a rake with a grappling, or gripping device for holding and picking up material such as leaves, lawn clippings, or trash when the rake is raised off the ground so that such material may be lifted and deposited in a receptacle without the operator of the rake having to bend or stoop for the material, or having to use another tool for such lifting.

There have been other grappling hand-rakes such as shown by the patent to Frederick, 828,646, August 14, 1906, and many others in class 56, subclass 400.12, but these prior art rakes had grappling means which interfered with the operation of the tool as a rake and which failed to grip and pick up all types of lawn and garden trash. Also, such prior art devices have lacked a simple and satisfactory construction of the grappling means, including the operating linkage.

Having in mind these and other defects of the prior art, it is an object of the present invention to adapt and add to a conventional form of rake a mechanism which with the rake will form a grapple.

Another object of the invention is the construction of such a grapple so that it will operate with the rake in the position in which it is normally used.

Another object is that of providing a rake with a gripping jaw that may be easily applied and removed from a conventional rake.

Still another object of the invention is that of providing means for maintaining the gripping jaw operating handle in its desired position.

The above mentioned defects are remedied and these objects achieved by using a forged steel rake having a double tang, one branch of the tang going to one end and the other branch going to the other end of the rake tooth bar, placing a hinge pin, or pintle, across, above, outboard, and secured to such branches rearwardly of the tooth bar. A single wire is bent to form the frame of a gripping jaw. This wire is bent around each outboard end of the pintle to form therewith a hinge bearing for the jaw; extends across the rake and loops upwardly and outwardly to form the operating lever for the jaw; and the ends of the wire curve backward and downward to have secured thereto and therebetween a curved sheet that forms the shoe of the gripping jaw.

A device constructed in accordance with the above outline is hereinafter described in detail and shown in the accompanying drawings, in which.

Figure 1:
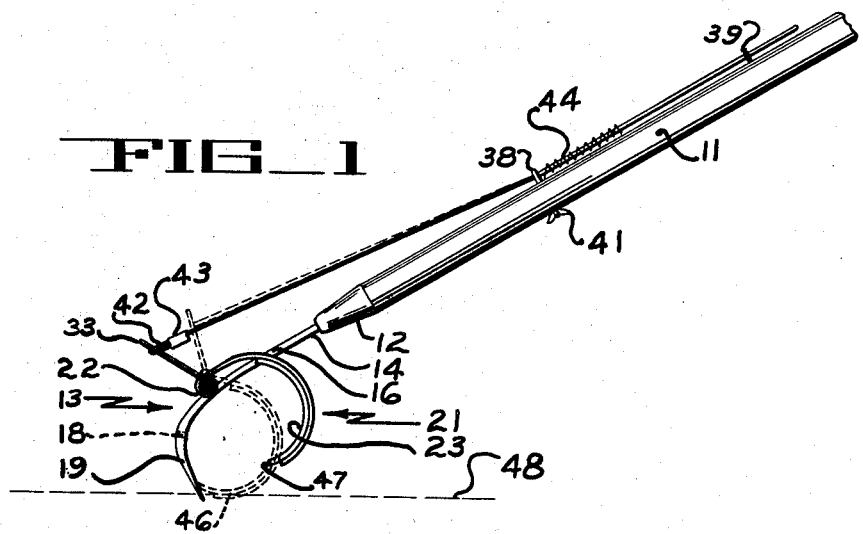
Figure 1 is a side view of a grappling hand-rake embodying one form of the present invention, and showing the rake in operating position with respect to the ground.
Figure 2:
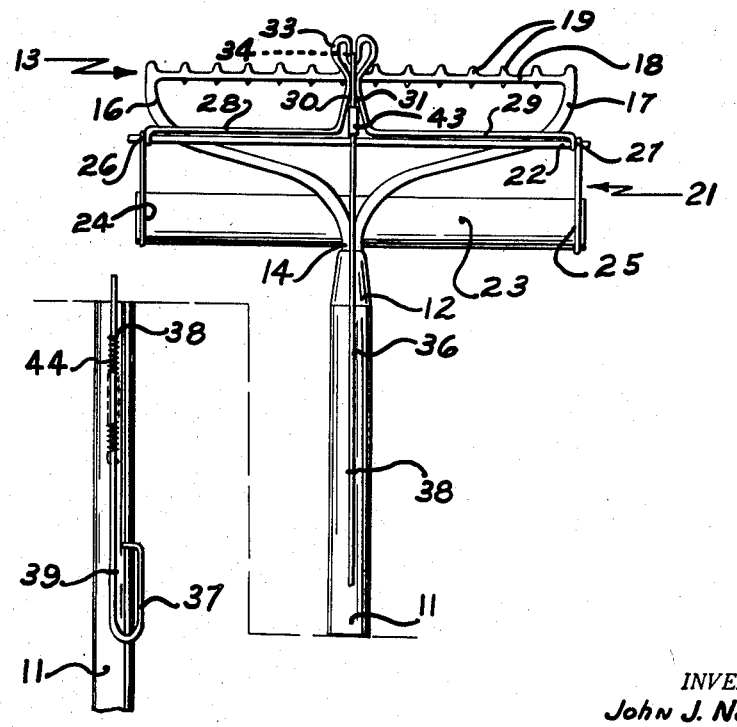
Figure 2 is a plan view of the device of Figure 1.

In the drawings there has been shown a form of rake usually found on the market. It has a handle 11 about five and a half feet in length with a tapered ferrule 12 at its lower end, and secured to the lower end of the handle is a rake head 13. The rake head has a double tang 14 placed in a socket in the lower end of the handle and secured therein by driving the ferrule 12 onto the handle. The two parts of the double tang are spread apart below the ferrule to form side branches 16, 17 and so that each such side may join to an end of the tooth bar 18. Rake teeth 19 are spaced apart along the tooth bar and extend downwardly with a slight rearward curve from such bar. The usual shape of the side branches 16, 17 has been altered so that they are longitudinally convex upward so as to give more room therebelow for the functioning of a gripping jaw 21 which pivots on a pintle 22 secured to, above, across, and outboard of the sides 16, 17 about midway between the tooth bar 18 and the handle ferrule 12. The angle of the teeth 19 with the length of the handle has been maintained as that of the original rake, substantially normal thereto.

The gripping jaw 21 is formed from two pieces of material, a wire frame and a curved sheet-metal shoe 23. The shoe shape is, generally, that of a portion of a cylindrical shell. The wire frame is made from a single piece of wire divided into equal length sides. Contiguous each end 24, 25 of the wire, the wire sides are curved to the circumference of the shoe 23 and secured thereto adjacent each end thereof. From each end thereof, the wire is then brought forward of the rake and each side wrapped around an outboard end of the pintle 22 to form bearings 26, 27 for the gripping jaw. The wire sides are then turned to the center of the rake and travel parallel to and above the pintle 22 to form offsets 28, 29 which lead to a central lever-arm loop having sides 30, 31 with a heart shaped eye 33 at the upper end of the arm. The reentrant portion 34 of the eye serves as a journal for the operating link 36 which extends from the lever up the handle to about its midportion where it terminates in an open loop 37. A pair of eyes 38, 39 are secured to the handle and guide the link 36 by its being passed thru the eyes. It is to be noted that the lower eye 38 has its stem passing thru the handle and is secured thereto by means of a wing nut 41. The lower end of the link is formed with a hook 42 which acts as a bearing on the journal 34 in the heart shaped eye 33 of the lever arm 30—31. The hook 42 is seized with a loose fitting sleeve 43. When the sleeve 43 is retracted from the hook, the journal 34 may be moved rearward thru the hook to disengage the journal and the hook. The link may then be removed from the handle by removing the lower eye 38 therefrom and swinging the link to thread the upper eye 39 thru and out of the upper end loop 37. The gripping jaw 21 is easily removed from its pintle 22 by springing the bearings 26, 27 apart. The lever loop 30—31 allows this springing apart of the bearings. A tension spring 44 secured between the lower eye 38 and the link at a point between the handle eyes 38, 39 biases the link toward the rake head and the gripping jaw 21 to open position, the illustrated full line position. Closing of the jaw is had by a thumb or finger of the operator of the rake engaging in the link loop 37 and moving the link upwardly of the handle and away from the rake head.

It is to be noted that when the gripping jaw 21 is in the closed position, the dotted line showing 46 of Figure 1, that the lower edge 47 of the shoe 23 contacts the rake teeth 19 a distance above and away from their points. This distance is about a half to three-quarters of an inch. This means that the points of the teeth may be buried in the grass or dirt a short distance, as is normal when raking, and the shoe can completely close against the rake teeth. The ground or lawn surface is indicated by a broken line 48. Further, this placing of the shoe and teeth contact above the teeth points gives the shoe more clearance from the ground so that the rake handle does not need to be raised above its normal use position so that the gripping jaw will clear the ground at the lowest part of its swing in closing. This ground clearance is enhanced by the longitudinal upward convexity of the side branches 16, 17 of the rake head, which convexity raises the pintle 22 above the ground and, yet, keeps it close to the lower end of the rake. This, also, allows the jaw capacity to be relatively large without there being shoe and ground interference.

The shape of the eye 33 at the end of the lever is such that the sides of the heart, or loop, bear against the lower part of the link hook 42 and prevent turning of the link about its longitudinal axis. This keeps the operating loop 37 of the link in a fixed and desired position.

The construction of the disclosed gripping jaw is such that it does not materially increase the weight of the rake. Thus the complete device is easy to handle and is sure to find favor with its users. With the jaw open, the rake is used as the rake portion thereof was intended to be used, without interference of such use by the gripping jaw. When material has been gathered by the rake, a slight pull by the operator on the link loop 37 brings the shoe 23 against the rake teeth 19 to the dotted line position 46 to imprison such raked material between the shoe and the rake teeth. The rake and material may then be lifted and the material deposited wherever desired by releasing the link loop to allow the gripping jaw to open under the urging of the biasing spring 44.

Having thus described an embodiment of my invention, its construction and operation, I claim:

1. A grappling hand-rake, comprising: a rake having a handle in the form of a pole with a forward end, and a rake head secured to said forward end; said head having a rake tooth bar transverse the length of said handle, rake teeth secured to said bar normally thereof, pointed downwardly, and substantially normal to the length of said handle, a side branch extending from each end of said tooth bar to the lower end of said handle, means securing said head and handle together, said side branches being longitudinally and upwardly convex, and pintle ends outboard of said side branches and secured thereto; a gripping jaw frame having bearings on said pintle ends outboard of said side branches, an operating lever centrally of said rake head, and ends spaced apart below said side branches, and a shoe extending between said ends; when said jaw is pivoted to closed position said shoe contacting said teeth removed from their points; and a link for operating said jaw, said link extending along and slidingly secured to said handle and secured to said lever for the operation thereof and of said jaw.

2. A gripping jaw for a grappling hand-rake, comprising: a wire formed to have an eye medially of its length and side portions extending therefrom symmetrically with respect to each other; each portion having a bearing formed therewith remote from said eye, said bearings being spaced apart and coaxial of an axis spaced from said eye; beyond and extending from said bearings, and angularly spaced about such axis from said eye, the portions are formed to engage a shoe; and a shoe extending parallel to such axis and engaged by and secured to such shoe engaging portions.

3. Added to the combination of claim 2, a rake having a tooth bar and teeth thereon, a handle, a tang branch extending from each end of said bar to said handle to secure bar and handle together, and pintle means transverse and secured to each of said branches and extending thru said bearings, said bearings being adjacent said tang branches, and a link secured to said wire medially thereof and extending along said handle so that longitudinal movement thereof pivots said jaw on said pintle means so that said shoe may be moved to or from said teeth.

4. A grappling hand-rake, comprising: a rake having a handle in the form of a pole with a forward end, and a rake head secured to said forward end, said head having a rake tooth bar transverse the length of said handle, rake teeth secured to said bar normally thereof, pointed downwardly, and substantially normal to the length of said handle, a side branch extending from each end of said tooth bar to the lower end of said handle, means securing said head and handle together, and said side branches being longitudinally and upwardly convex; a gripping jaw for said rake having a frame formed from a wire adapted to have an operating link secured to its medial portion; side portions of said wire extending and formed symmetrically with respect to each other from said medial portion, and forming a bow; each side portion in said bow and each side branch having cooperating elements of a rotation bearing formed therewith remote from said medial portion, said bearings being spaced apart and rotationally coaxial of an axis spaced from said medial portion; beyond said bow and bearings and extending from said bearings, and angularly spaced about such axis from said medial portion, the side portions are formed as shoe engaging portions; and a shoe extending parallel to such axis and engaged by and secured to such shoe engaging portions; whereby said side portions may be sprung with respect to each other so that said bearing elements may be interfitted; and a link movable on said handle and engaging said medial portion whereby movement of said link will cause said jaw to have pivotal movement at said bearings and said shoe to move to and from said teeth.

5. A gripping jaw frame for a grappling hand-rake, consisting of a wire having an eye formed thereby at its central portion, the wire having side portions extending from such eye to form a lever and, with respect to each other, each portion diverging to and being formed into a bearing loop with the openings of said bearing loops being in alignment for the reception of a pintle, and, beyond said bearing loops from said eye, the ends of said portions extending and being adapted to be secured to a shoe.

6. The combination of claim 5 having added thereto, a rake having a handle and a rake head secured thereto, a pintle carried by said head, said pintle carrying said bearing loops, a shoe between said ends of said portions, and a link secured at one end to said central portion and slidably extending along said handle for the operation of said jaw frame and shoe.

References Cited in the file of this patent
UNITED STATES PATENTS

| 828,646 | Frederick | Aug. 14, 1906 |
| 1,160,282 | Harris et al. | Nov. 16, 1915 |
| 2,136,849 | Hembree | Nov. 15, 1938 |
| 2,770,483 | Patnaude | Nov. 13, 1956 |